3,600,198
PROCESS OF PRESERVING FISH WITH BIOCIDAL MIXTURE
Beatrice Gonthier, Caluire, and Jacques Mocotte, St.-Didier-au-Mont-d'Or, France, assignors to Progil, Paris, France
No Drawing. Filed Apr. 22, 1969, Ser. No. 818,396
Claims priority, application France, Apr. 29, 1968, 149,997
Int. Cl. A23l 3/34
U.S. Cl. 99—158                        8 Claims

ABSTRACT OF THE DISCLOSURE

Fish are preserved by contacting with ice or an aqueous solution containing a mixture of propionic acid and benzoic acid buffered to a pH less than 7 by adding to the acids their corresponding salts of alkali metals or magnesium.

---

The present invention relates to a method of preserving fish to inhibit their degradation. The present invention provides new biocidal compositions for use to preserve the freshness of fish and to prevent the degradation of foods containing sea-water or fresh-water fish.

It is known that fish, either whole or eviscerated, must be preserved in ice or in a cooling brine during storage and shipment to their places of distribution both on the fish boats and on all subsequent transport. In order to improve the storage time, it has been recommended to add germicidal and bactericidal substances to the ice or the fish washing water; such substances are chosen among various chemical classes such as mineral or organic acids bearing or not bearing other functions, halogenated derivatives, alcohols, phenols, organic or mineral oxidizing agents, nitrites, amines, antibiotics, etc. Bailliere's Encyclopedie du Froid, Book: "Fish Conservation by Means of Cold" by F. Soudan, pp. 142–158 (1965), Partmann, Zeitscrift Lebensmittel Untersuch w. Forschung, vol. 94, pp. 246–264 (1952); Fishery Leaflet 428 of U.S. Department of Interior, Bureau of Commercial Fisheries, pp. 1–84 (December 1956).

In the class of organic acids, the use of formic, acetic, propionic, benzoic acids or their alkaline salts have been especially recommended.

It has now been found that a synergistic activity is obtained of the biocidal properties of the two constituents when a new combination of organic acids and their salts is utilized. The combination is a mixture of propionic acid and benzoic acid buffered with their corresponding salts of alkali metals or of magnesium.

The new compositions according to the invention are mixtures of a buffered mixture of propionic acid/metal propionate and of a buffered mixture of benzoic acid/metal benzoate the total pH of which is lower than 7 and preferably between 4 and 5.

The following are examples of such compositions: propionic acid-sodium propionate and benzoic acid-sodium benzoate; propionic acid-magnesium propionate and benzoic acid-sodium benzoate; propionic acid sodium propionate and benzoic acid-magnesium benzoate; and propionic acid-magnesium propionate and benzoic acid-magnesium benzoate.

The respective ratios of alkali metal or magnesium salt to the organic acid in the buffered systems depend upon the desired pH; to obtain a pH within the limits indicated heretofore, the molar ratio of salt/corresponding acid may vary from 0.1/1 to 100/1.

The quantities of each buffered system in the mixture may be chosen within a large range, the volume ratios of propionic acid and propionate to benzoic acid and benzoate being preferably between 0.5/1 and 99/1.

Further, the efficient quantities of the biocidal mixtures according to the invention, in order to obtain the desired protection and to extend fish preservation time depend upon several factors, such as: fish type (from sea-water or fresh water); time chosen for treatment (immediately after fishing or N days after it); application mode (incorporation in ice or fish washing water); duration, etc.

The optimal conditions may be easily determined by one skilled in the art. However, it may be said by way of example, that when the active mixture according to the invention is intended to be incorporated in the ice used for fish storing, it is advantageous to use 0.5 to 10 g. of mixture per liter of ice. When, on the contrary, the bactericidal composition is used during fish treatment by soaking, aqueous soaking baths may contain 0.5 to 200 g. of active product per liter of water, the optimal quantity varying according to immersion time. For a very short time, for example, 2 to 10 minutes, an aqueous solution containing 50 to 200 g./l. of product will be satisfactory. For much longer times, such as, for example, 10 to 20 days, active substance concentration will preferably range between 0.5 and 5 g./l.

The biocidal mixtures according to the invention are excellent agents for the preservation of sea-water and fresh water fishes. They have the advantage of not changing the aspect and taste of the aquatic vertebrates with which they have been contacted. Moreover, they are not injurious since the constituents composing them have been accepted by the European Economical Community as preserving agents for foodstuffs. (R. A. Dehove, "La Règlementation des produits alimentaires et non-alimentaires," 6th ed., 1967).

The use of these compositions may take place in different ways. According to one method of application, the additive is introduced into water which, after freezing, is used as a germicidal ice for fish preservation. In a variant of those technics, the composition is introduced directly onto ordinary ice, for example, by means of sprinkling. According to another method of use, the required proportions of bactericidal additive are incorporated into the washing water used on whole or eviscerated fish which have been stored in ordinary ice or in ice already treated as above. Further, compositions according to the invention can be incorporated into the brine for storing fish pieces or waste intended after drying for flour and powder fabrication for cattle feeding to inhibit putrefaction phenomena and to avoid losses in nutritious substances. According to a variation of these techniques, it is also possible to treat fish pulverulent fluors directly by spraying, for example, on the food, an adsorbate of the diluted solutions of the new buffered mixtures deposited on an inert filler.

The following examples, quoted in a purely illustrative way, emphasize the efficiency of the bactericidal mixtures according to the invention and show some methods of their application.

The methods used for determining and measuring fish deterioration, in the following tests, are the recommended ones, well known by the experts in this field, that is:

Insulation of bacteria from the fish skin and muscles, then measure the biocidal mixture efficiency according to the capacity of the bacteria to develop or not.

Examination of fish freshness state by means of macroscopic characteristics (color, smell, stiffness, etc.)

Organoleptic tests in which there are tastings of reference fishes and treated fishes.

Analytical determination of nitrogen-containing bases produced by autolysis and fish bacterial degradation, after the stage of cadaveric stiffness. In this well known method, the whole of the steam-volatile bases is determined under the form of "total volatile basic nitrogen" (see for example: Booklet 31, published by the Association d'Hygiène Alimentaire (1963). Paper called "Controle de la qualité et de la salubrité des poissons et des coquillages" J. Pantaléon an P. Rosset).

In the following examples, the results are expressed under the shortened term TVBN (total volatile basic nitrogen), in mg. of nitrogen per 100 g. of fish.

EXAMPLE 1

A germicidal ice was made by freezing a water to which had been added 2 g./l. of a mixture A having 95 parts (by volume) of the buffered propionic acid/sodium propionate of pH 4.5 and 5 parts (by volume) of the buffered benzoic acid/sodium benzoate of pH 4.5.

Simultaneously for purposes of comparison, there were prepared 2 other germicidal ices from a 2 g./l. aqueous solution, containing either the buffered mixture (B): propionic acid/sodium propionate of pH 4.5 or the buffered mixture (C): benzoic acid/sodium benzoate of pH 4.5.

Whitings eviscerated and stored for 4 to 6 days after being caught were divided into 4 lots which have been stored as follows: the first lot in ordinary ice, free from bactericide, the second lot in ice containing the mixture A according to the invention, the third and fourth lots in ice containing respectively product B and product C.

After 6 days of preservation, the fish lots were separated from their ice and measurements of total volatile basic nitrogen were made as described hereinabove. Fishes stored in ordinary ice (blank) presented a TVBN of 36 mg./100 g. of fish and the ones preserved in ices B and C gave respectively the numbers of 23 mg./100 g. and 32 mg./100 g. However, fishes kept in the germicidal ice A presented a TVBN of only 18. Moreover, fish meat of this last lot was firm and tasting has proven that it had kept all its flavor, while the fishes of the reference group were in a decomposition state and the ones of groups B and C were consumable only with difficulty.

During a continuation of the tests for a further month, the following TVBN numbers were obtained: blank: 70; ice B: 40; ice C: 67; ice A: 21 (the mixture according to the present invention).

EXAMPLE 2

The same types of tests and comparisons as in Example 1 were made with whole trouts, which since catching have been kept in 4 ice lots with bactericide concentrations, which were identical to the ones used in Example 1.

After 30 days of storage in a cooler, TVBN measures were made and the following results were obtained:

Blank _____ 45
Group A fish _____ 23
Group B fish _____ 29
Group C fish _____ 32

In other series of longer tests, it was determined that the TVBN number passed only from 23 to 26 after 5 further days, while the numbers 29 and 32 of the comparative tests reached respectively 40 and 65 after the same time.

EXAMPLE 3

Pieces of whiting muscles caught 8 days ago were immersed for 2 days in aqueous solutions containing 2 g./l. of the following products at a temperature of 25° C.

Group D: buffered system: propionic acid-sodium propionate at pH 4.5
Group E: propionic acid-sodium propionate plus benzoic acid-sodium benzoate with pH 4.5; the ratio by volume of the two constituents being 70/30.

After 48 hours of immersion, the following results were obtained by TVBN measurement (in mg./100 g. of fish):

Blank (non treated water) _____ 430
Water treated with D _____ 33
Water treated with E _____ 27

EXAMPLE 4

Whole whitings, caught 4 days ago, were immersed for 5 minutes at a temperature of 25° C., in acqueous solutions containing 50 g./l. of the products D and E identical to Example 3.

After immersion, fish were left for 48 hours and TVBN was measured. The results were as follows (in mg./100 g. of fish):

Blank (non treated water) _____ 131
Water treated with D _____ 36
Water treated with E _____ 27

EXAMPLE 5

Pieces of whiting muscles, caught 8 days ago, were immersed for respectively 3 days and 7 days at a temperature of 25° C. in aqueous solutions containing 2 g./l. of the following products (pH=4.5):

Group C: benzoic acid-sodium benzoate
Group F: propionic acid-magnesium propionate
Group G: 95 parts (volume) of the buffered: propionic acid-magnesium propionate and 5 parts of the buffered: benzoic acid-sodium benzoate
Group H: 50 parts (volume) of the buffered: propionic acid-magnesium propionate and 50 parts of the buffered: benzoic acid-sodium benzoate.

After immersion TVBN was measured and the following results were obtained:

| Days | 3 | 7 |
|---|---|---|
| Blank (non treated water) | 630 | 980 |
| Water treated with: | | |
| C | 168 | -------- |
| F | 38 | 58 |
| G | 35 | 51 |
| H | 32 | 39 |

As may be seen from the results of the tests shown in the five examples above, bactericidal mixtures according to the present invention have an efficiency greater than the efficiency of either propionic or benzoic acids buffered by Na or Mg salts. It will be noted also that the buffered solution: propionic acid-Mg propionate also gives extremely interesting results. This mixture which is also new, constitutes an object of the present invention.

What is claimed is:

1. A process of fish preservation wherein fish are contacted with biocidal compositions containing a mixture of propionic acid and benzoic acid buffered to a pH of about between 4 and 5 by adding to said acids the corresponding alkali metal salt or benzoic acid and the alkali metal or magnesium salt of propionic acid.

2. A process according to claim 1 wherein the biocidal composition is in the form of ice.

3. A process according to claim 1 wherein the biocidal composition is an aqueous solution.

4. A process according to claim 1 wherein the biocidal composition contains 0.5 to 200 g. of buffered mixture per liter of composition.

5. A process according to claim 1 wherein the biocidal composition contains 0.5 to 10 g. of buffered mixture per liter of composition.

6. A process according to claim 1 wherein the ratio by volume of propionic acid-metal propionate/benzoic acid-metal benzoate is about 0.5/1 to 99/1.

7. A process according to claim 6 wherein the molar ratio of salt/corresponding acid for each constituent of the mixture is about 0.1/1 to 100/1.

8. A process according to claim 1 wherein biocidal composition is applied to dry fish products.

(References on following page)

References Cited

UNITED STATES PATENTS

| | | | |
|---|---|---|---|
| 2,294,428 | 9/1942 | Stockhamer | 99—160 |
| 2,622,030 | 12/1952 | Frandsen | 99—155 |
| 2,933,399 | 4/1960 | Nickerson et al. | 99—158X |
| 3,097,996 | 7/1963 | Thoma et al. | 162—22 |
| 3,276,881 | 10/1966 | Troller | 99—139 |

FOREIGN PATENTS 780,330   7/1957   Great Britain.

NORMAN YUDKOFF, Primary Examiner

F. E. DRUMMOND, Assistant Examiner

U.S. Cl. X.R.

99—150R, 160, 195, 209, 224; 252—407